United States Patent [19]

Noguchi

[11] Patent Number: 4,475,216
[45] Date of Patent: Oct. 2, 1984

[54] FSK DATA TRANSCEIVER
[75] Inventor: Toyota Noguchi, Kyoto, Japan
[73] Assignee: Matsushita Electric Industrial Co., Ltd., Osaka, Japan
[21] Appl. No.: 377,249
[22] Filed: May 11, 1982
[30] Foreign Application Priority Data May 15, 1981 [JP] Japan ................................ 56-73724

[51] Int. Cl.³ ........................................... H04L 27/10
[52] U.S. Cl. ......................................... 375/45; 375/81
[58] Field of Search ....................... 375/7, 8, 9, 80, 81, 375/82, 88, 45; 329/50, 122; 455/73, 205, 208, 615

[56] References Cited
U.S. PATENT DOCUMENTS 3,667,046  5/1972  Schoolcraft ........................... 375/81
3,777,272  12/1973  Fletcher et al. ...................... 375/82
4,085,378  4/1978  Ryan et al. ............................ 375/81
4,253,067  2/1981  Caples et al. ......................... 375/80
4,290,140  9/1981  Malm .................................... 375/82
4,344,178  8/1982  Waters .................................. 375/81

Primary Examiner—Robert L. Griffin
Assistant Examiner—Stephen Chin
Attorney, Agent, or Firm—Wenderoth, Lind & Ponack

[57] ABSTRACT

An FSK data transceiver for long distance data communication is arranged such that transmitted data is composed of coded information in binary form. The data carrier signal utilized in the transceiver is a continuous rather than an intermittent signal and the receiver portion of the transceiver tracks the transmitted carrier signal so as to not lose the signal. The receiver performs an averaging process on the received data for improving the signal to noise ratio of the received signal.

5 Claims, 4 Drawing Figures

FSK DATA TRANSCEIVER

BACKGROUND OF THE INVENTION

This invention relates to a data transceiver, and more particularly to an FSK data transceiver which is capable of long distance data communication.

Conventionally, many kinds of radio communication methods are used for a transceiver system. The most familiar radio communication modulation method is amplitude modulation (AM). The AM method is widely used in citizen band radio transceivers. The frequency modulation (FM) method is also widely used for radio transceivers. These radio communication methods have sufficient performances for audio communication in the case of short distance communication to a certain extent, but are still insufficient for long distance communication and for reducing power consumption. Further, Morse telegraphy communication systems are also insufficient for long distance communication and for reducing power consumption. In order to improve the performances in long distance communication, the narrow bandwidth signal system has been introduced, but has not resulted in any improvement because of the oscillation frequency turbulence or drift and unsophisticated narrow band techniques.

SUMMARY OF THE INVENTION

An object of the present invention is to provide an improved FSK data transceiver for long distance data communication.

According to the present invention, transmitted data comprises coded information which is composed of the combination of "1" and "0" data similar to Morse code. The data transceiver of the present invention is different from the conventional Morse telegraphy communication system in that: the data carrier signal is not an intermittent signal but a continuous signal; a receiver tracks the transmitted carrier signal so as to not lose the signal; and the receiver performs an averaging process on the received data for improving the SN ratio (signal to noise ratio) of the received signal.

BRIEF DESCRIPTION OF THE DRAWINGS

Hereinafter, a preferred embodiment of the present invention will be detailedly described with the accompanying drawings in which.

DESCRIPTION OF THE PREFERRED EMBODIMENT

Figure 1:
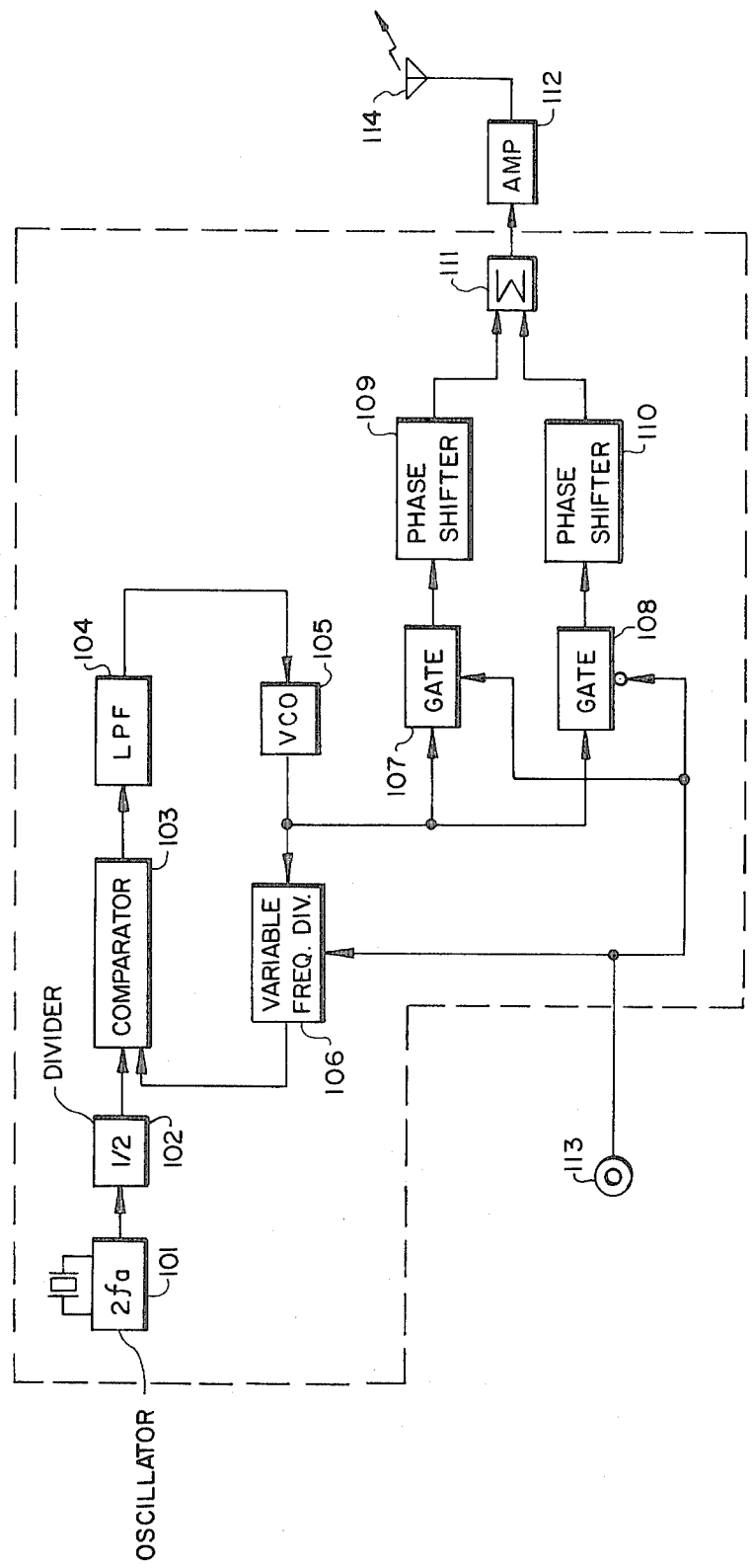
FIG. 1 is a block diagram of an embodiment of the transmitter portion of a data transceiver according to the present invention.
Figure 3:
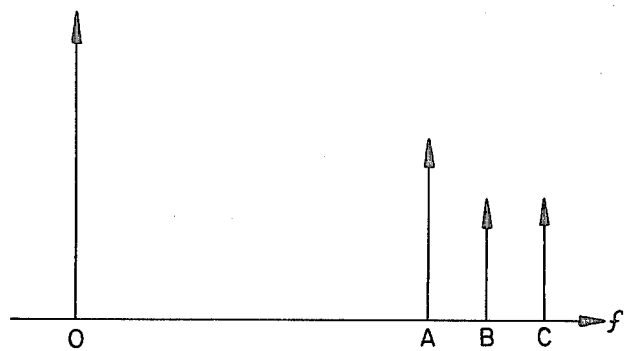
FIG. 3 shows the frequency spectrum of signals in the same transceiver.

Referring now to FIG. 1 which is a block diagram of the transmitter portion of a data transceiver according to the present invention, a crystal oscillator 101 generates a continuous signal of a frequency 2fa. Here, we assume 2fa=2 kHz, and therefore, fa=1 kHz hereinafter. The frequency of an output signal of a ½ divider 102 is 1 kHz. A so-called Phase Locked Loop (PLL, hereafter) is formed by a phase comparator 103, a low pass filter (LPF, hereafter) 104, a voltage controlled oscillator (VCO, hereafter) 105 and a variable frequency divider 106. The variable frequency divider 106 acts as a 1/N divider or a 1/(N+1) divider according to a control signal supplied at an input port 113. The variable frequency divider 106 is set so that it becomes a 1/N divider when the control signal supplied at the input port 113 is "Low" ("0") and becomes a 1/(N+1) divider when the control signal is "High" ("1"). Accordingly, the frequency of an output signal of the VCO 105 is Nfa=N kHz when the control signal from the input port 113 is "0", and (N+1)fa=(N+1) kHz when the control signal is "1". The output signal of the VCO 105 is supplied to a first gate 107 and a second gate 108. The first gate 107 passes the output signal of the VCO 105 when the control signal from the input port 113 is "0", and stops the same signal when the control signal from the data input port 113 is "1". On the contrary, the second gate 108 passes the output signal of the VCO 105 when the control signal from the input port 113 is "1", and stops the same signal when the control signal from the input port 113 is "0". The outputs of the first gate 107 and the second gate 108 are respectively connected to a first phase shifter 109 and a second phase shifter 110. The gates 107 and 108 are respectively provided for the phase shifters 109 and 110 so as to enable them to operate effectively. The phase shifters 109 and 110 adjust the for phase error caused by the delay time difference. An output signal of the first phase shifter 109 is cos (2πNfat) and an output of the second phase shifter 110 is cos {2π(N+1)fat}. A signal adder 111 adds the output signal of the first phase shifter 109 with the output signal of the second phase shifter 100, and outputs the signal cos (2πNfat) when the control signal from the input port 113 is "0", and the signal cos 2π(N+1)fat when the control signal from the input port 113 is "1". The output signal of the signal adder 111 is amplified by an antenna driver amplifier 112 and is radiated by an antenna 114. The spectra of the above described signals are shown in FIG. 3 in which the signal cos (2πNfat) corresponds to the spectrum B and the signal cos 2π(N+1)fat corresponds to the spectrum C.

Figure 2:
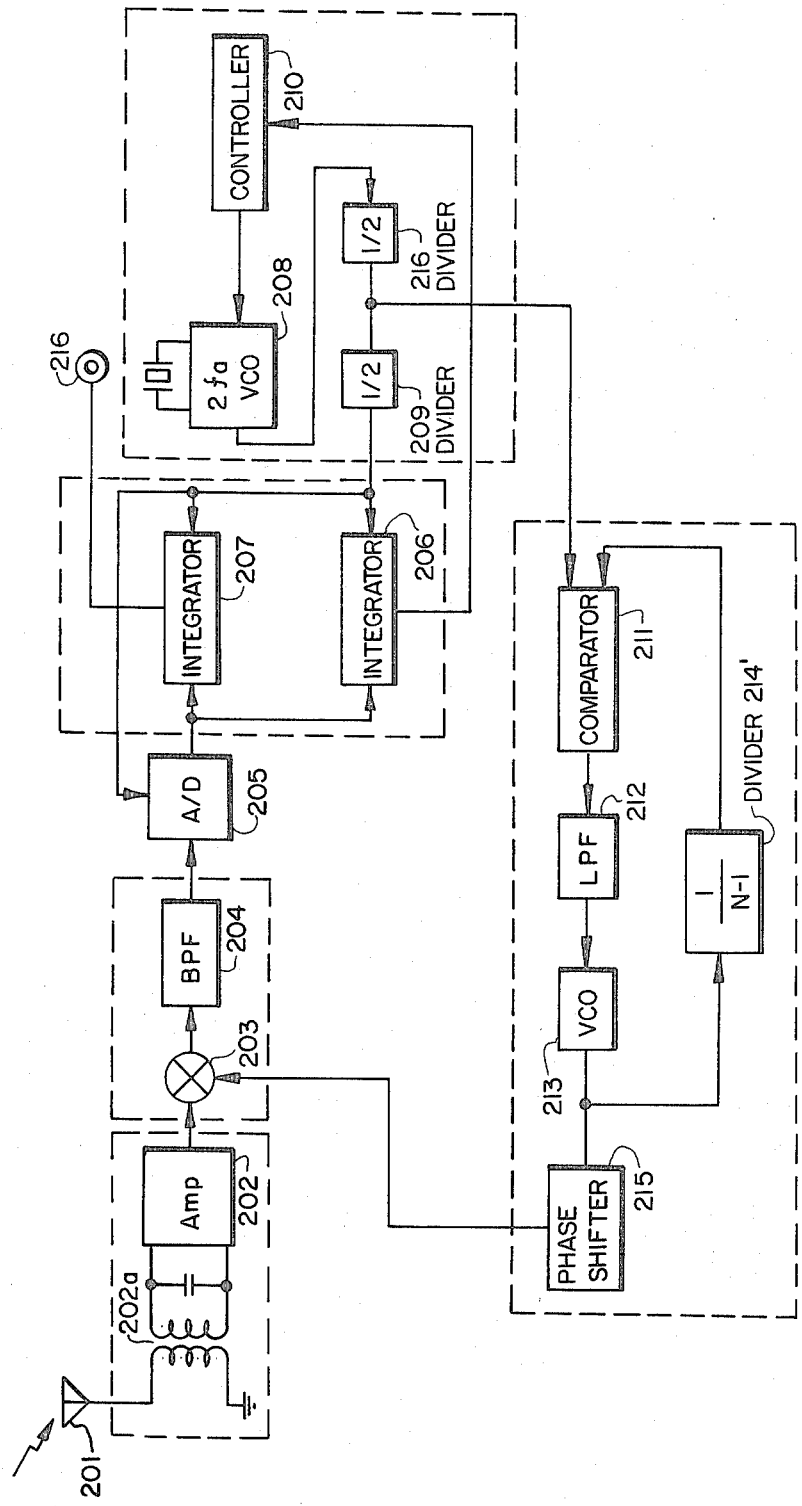
FIG. 2 is a block diagram of an embodiment of the receiver portion of a data transceiver according to the present invention.

FIG. 2 is a block diagram of an embodiment of the receiver portion of a data transceiver according to the present invention. Referring to FIG. 2, an antenna 201 catches the transmitted signal from the transmitter portion (as shown in FIG. 2) of the data transceiver and supplies the same signal to a high-frequency amplifier 202. This high-frequency amplifier 202 has a LC resonator 202a and selects a frequency roughly. A signal mixer 203 mixes (i.e. multiplies) an output signal from the high-frequency amplifier 203 with a signal from a phase shifter 215, so that an output signal of this mixer 203 contains a component corresponding to the multiplication of the two signals from the high-frequency amplifier 203 and the phase shifter 215. The output signal of the signal mixer 203 passes through a band-pass filter 204 so as to result in a signal having further strictly selected frequency. The signal passed by the band-pass filter 204 is supplied to an A/D converter 205. The A/D converter 205 converts the input analog signal which is from the band-pass filter 204 to a digital coded signal. The digital coded signal are supplied to a first integrator 206 and a second integrator 207. Here, the integrators 206 and 207 are assumed to be integrators using digital adders, so that the digital coded signal is assumed to be a converted signal by the so-called PCM type A/D converter. Furthermore, the converting timing of the A/D converter 205 is ¼ of the repetition frequency of the frequency (2fa) of an output signal of a voltage controlled oscillator (VCO, hereafter) 208. The integration timing of each of the first and the second integrators 206 and 207 is ¼ of the repetition frequency of the frequency (2fa) of the output signal VCO 208. The integration timing of the integrators 206 and 207 is generated by the cascade connection of two ½ dividers 216 and 219 as shown in FIG. 2.

As an example, as assuming that the dynamic range of each of the integrators 206 and 207 is 20 bits and that of the A/D converter 205 is 12 bits and further assume that the output of the A/D converter 205 is $D_1 = \oplus 00001101011$ and the output of either of the integrators 206 or 207 is $D_2 = \oplus 000110101011100100111$. The output of the integrator at the next timing becomes $D_3 = \oplus 000110101011110010010$ $(=D_1+D_2)$. The integrators 206 and 207 are used for tracking the frequencies contained in the input signal of the receiver and detecting two kinds of frequencies which refer to two kinds of data "1" and "0".

The functions of the integrators 206 and 207 are fully explained in the following descriptions by referring to FIG. 4.

Figure 4:
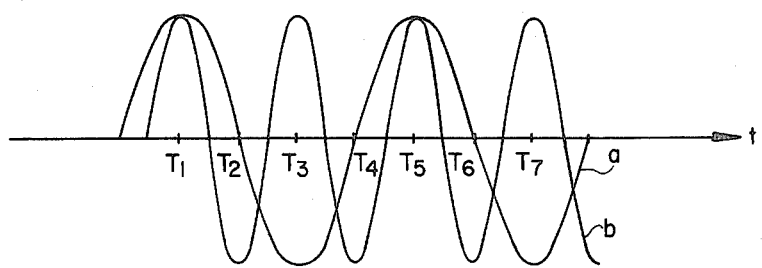
FIG. 4 shows the waveforms of signals in the same transceiver.

FIG. 4 shows the two kinds of frequencies contained in the input signal of the receiver. The cosine wave a is cos (2πfat) and the cosine wave b is cos (4πfat), i.e. the frequency of b is twice that of a. The waves a and b are down converted signals of the input signal at the antenna 201, so that the frequency difference between the waves a and b is the same as that between the signals B and C shown in FIG. 3. In this case, a local signal which is an output signal of the phase shifter 215, is cos $\{2\pi(N-1)fat\}$, the spectrum thereof being shown as A in FIG. 3. The waves a and b are alternately supplied to the A/D converter 205. The converted digital coded signal is the supplied to the first integrator 206 and the second integrator 207. The first integrator 206 integrates the digital coded signals at the times $T_1, T_5, \ldots$ as shown in FIG. 4, and the second integrator 207 integrates the digital coded signals at the times $T_3, T_7, \ldots$ as shown in FIG. 4. The number of integrations (i.e. the number of the integrating times) is determined previously, for example, to be 1000 times.

The output data of the first integrator 206 and the second integrator 207 are as follows:

(The output data of the first integrator)=$(AT_1+AT_5+AT_9+ \ldots)$     (1)

(The output data of the second integrator)=$(AT_3+AT_7+AT_{11}+ \ldots)$     (2)

where $AT_i$ (i=1,5,9, ... or 3,7,11) shows the amplitude data which is the digital coded signal. In the case shown in FIG. 4, the output data of the first integrator 206 becomes a large positive (⊕) value. This is the case in which the phases of the two signals are equal and the frequencies of the two signals are in an integer ratio with respect to each other. The output data of the second integrator 207 becomes one of two kinds of values, a large positive (⊕) value and a large negative (⊖) value. The sign ⊕ corresponds to said wave b, and the sign ⊖ corresponds to said wave a. The output data of the first and the second integrators 206 and 207 become large values when the phases of the two signals are equal and the frequencies of the two signals are in an integer ratio relationship. On the other hand, when the phases and the frequencies of the two signals are different from each other, the output data of the first and the second integrators 206 and 207 become almost zero. In other words, the output data of the first integrator 206 and the second integrator 207 become zero when said integration timing does not coincide with the input signal. This means random signals such as noise or undesired signals are reduced.

The output data of the first integrator 206 is used for tracking the input signal including the signals B and C shown in FIG. 3. The output data of the second integrator 207 is used for detecting the data "1" and "0". By using these integrators, data "1" and "0" can be detected in the case of the co-phase signals as shown in FIG. 4. But undesired signals are reduced by cancellation of positive and negative signals. Accordingly, the data transceiver of the present invention can be used in a low S/N condition.

In order to effect the above-mentioned condition, the signals cos $\{2\pi(N-1)fat\}$ must be generated by the phase shifter 215.

Next, a controller 210 will be described. When the VCO 208 does not lock the transmitted input signal, the output data of the first integrator 206 becomes zero. In other words, the transmitted input signals cannot be tracked. In this case, the controller 210 makes the frequency of the output signal of the VCO 208 sweep gradually. In other words, the output data of the first integrator 206 and the second integrator 207 are checked after the predetermined number (1000) of integrations, and then the controller 210 varies the frequency of the output signal of the VCO 208 if the output data of the first integrator 206 is sufficiently small. By repeating this operation for sweeping in a fixed direction (i.e. a frequency increasing direction or a frequency decreasing direction), the output data of the first integrator 206 is made to reach its peak value. This condition is called the locked or tracked condition.

On the other hand, a phase locked loop is configured by a comparator 211, a low-pass filter 212, a VCO 213 and a 1/(N−1) divider 214. One input of the comparator 211 is connected to an output of the ½ divider 216 and another input of the comparator 211 is connected to an output of the 1/(N−1) divider 214. So, if the frequency of an output signal of the ½ divider 216 becomes fa, in other words the frequency of the output signal of the VCO 208 becomes 2fa, an output signal of the VCO 213 becomes cos $\{2\pi(N-1)fat+\phi\}$, wherein, $\phi$ is the unwanted phase error. The phase shifter 215 can eliminate this phase error $\phi$, so that the output signal of the phase shifter 215 becomes cos $\{2\pi(N-1)fat\}$. Accordingly, the transmitted input signal can be tracked.

In the way above, the first integrator 206 integrates the digital coded signal at the times corresponding to ¼ of 2fa (i.e. $T_1, T_5, \ldots$ in FIG. 4), and the output data of the first integrator 206 reaches its peak value by the control of the controller 210, whereby the receiver can tracks the input signal thereof.

In order to make the output data of the first integrator 206 be at its peak value, the controller 210 stores the previous output data, and compares the stored output data with the new output data of the first integrator 206, thereby detecting the tracking condition. The second integrator 207 outputs the transmitted data which is the same as the data from said data input port 113 in FIG. 1. In the actual data transceiver some of, the same blocks in FIG. 1 and FIG. 2, such as the crystal oscillator and the PLL are shared by both the transmitter and receiver portions.

As seen from the foregoing, the present invention can realizes a stable signal processing of the data transceiver, so that the S/N ratio can be improved, and the data transceiver for long distance communication can be realized.

What is claimed is:

1. A FSK data transceiver attached to an antenna and comprising a transmitting means and a receiving means, wherein said transmitting means comprises:

an external signal input port for inputting an external signal;

a signal generator for generating two kinds of signals having different frequencies and outputting one of said two kinds of signals according to said external signal;

an antenna driver for amplifying the output signal of said signal generator, said antenna being coupled to said antenna driver;

and wherein said receiving means comprises:

a signal amplifier for amplifying a signal received by said antenna;

a local oscillator for generating a local frequency signal;

a frequency converter for mixing an output signal of said signal amplifier and said local frequency signal;

an A/D converter for converting an output signal of said frequency converter to a digital coded signal;

a first integrator for integrating said digital coded signal during a first time period;

a second integrator for integrating said digital coded signal during a second time period which is shifted from first time period;

an output port coupled to said second integrator; and a control means for generating a first timing signal which is supplied to said A/D converter and said first and second integrator and a second timing signal which is supplied to said local oscillator, wherein said control means controls said first timing signal so that an output signal of said first integrator is at its maximum value.

2. An FSK data transceiver according to claim 1, wherein a frequency ratio of said two kinds of signals generated by said signal generator is N, wherein N is an integer.

3. An FSK data transceiver according to claim 1, wherein said control means comprises:

a frequency generator which is controlled by said output signal of said first integrator; and a frequency divider for dividing the frequency of an output signal of said frequency generator so as to thereby generate said first and second timing signals.

4. An FSK transceiver according to claim 1, wherein said control means comprises:

a frequency generator controlled by said output signal of said first integrator; and a ½N frequency divider for dividing the frequency of an output signal of said frequency generator so as to thereby generate said first timing signal, wherein N is an integer.

5. A data transceiver according to claims 3 or 4, wherein said frequency generator includes a voltage controlled oscillator.

* * * * *